US009471756B2

(12) United States Patent
Sung et al.

(10) Patent No.: US 9,471,756 B2
(45) Date of Patent: *Oct. 18, 2016

(54) METHOD AND APPARATUS FOR AUTHORIZING A SOFTWARE PRODUCT TO BE USED ON A COMPUTER SYSTEM

(75) Inventors: Edmund Yu Liang Sung, Millbrae, CA (US); Timothy A. Rosemore, Reno, NV (US); Jennifer Possin, San Francisco, CA (US); Raymond S. Tenenbaum, Redwood City, CA (US); Stephen L. Molloy, Andover, MA (US)

(73) Assignee: INTUIT INC., Mountain View, CA (US)

(*) Notice: Subject to any disclaimer, the term of this patent is extended or adjusted under 35 U.S.C. 154(b) by 1681 days.

This patent is subject to a terminal disclaimer.

(21) Appl. No.: 11/476,990

(22) Filed: Jun. 27, 2006

(65) Prior Publication Data
US 2007/0299779 A1    Dec. 27, 2007

(51) Int. Cl.
G06F 9/445    (2006.01)
G06F 21/12   (2013.01)
G06Q 30/02   (2012.01)

(52) U.S. Cl.
CPC ......... *G06F 21/121* (2013.01); *G06Q 30/0204* (2013.01); *G06Q 30/0205* (2013.01); *G06F 8/60* (2013.01)

(58) Field of Classification Search
CPC ....................................................... G06F 9/445
USPC ............................... 717/174; 705/14.38, 340
See application file for complete search history.

(56) References Cited

U.S. PATENT DOCUMENTS

| | | | |
|---|---|---|---|
| 4,888,798 A | 12/1989 | Earnest | |
| 5,398,285 A | 3/1995 | Borgelt | |
| 6,169,976 B1 | 1/2001 | Colosso | |
| 6,442,559 B1 | 8/2002 | Martinsen | |
| 6,766,305 B1* | 7/2004 | Fucarile et al. | 705/51 |
| 7,236,942 B1* | 6/2007 | Walker et al. | 705/14.65 |
| 2001/0011253 A1* | 8/2001 | Coley et al. | 705/59 |
| 2002/0010863 A1* | 1/2002 | Mankefors | 713/189 |
| 2002/0128851 A1* | 9/2002 | Chefalas et al. | 705/1 |
| 2002/0194008 A1* | 12/2002 | Yang et al. | 705/1 |
| 2003/0004889 A1 | 1/2003 | Fiala | |
| 2004/0044631 A1 | 3/2004 | Walker et al. | |
| 2004/0044901 A1 | 3/2004 | Serkowski | |
| 2004/0125954 A1* | 7/2004 | Riebe et al. | 380/231 |
| 2004/0193545 A1* | 9/2004 | Shlasky | 705/59 |
| 2005/0027655 A1* | 2/2005 | Sharma et al. | 705/44 |
| 2005/0049893 A1* | 3/2005 | Tien | 705/1 |
| 2005/0050315 A1 | 3/2005 | Burkhardt | |
| 2005/0076334 A1* | 4/2005 | Demeyer | 717/177 |

(Continued)

FOREIGN PATENT DOCUMENTS

| | | | |
|---|---|---|---|
| EP | 1748375 A1 | 7/2006 | |
| EP | 1705610 A1 * | 9/2006 | |
| GB | 2439626 A | 5/2007 | |

*Primary Examiner* — Chat Do
*Assistant Examiner* — Jae Jeon
(74) *Attorney, Agent, or Firm* — Patterson & Sheridan, LLP (57) ABSTRACT

One embodiment of the present invention provides a system for authorizing a software product to be used on a computer system. During operation, the system receives authorization information at a database from a point of sale system located at a retailer, wherein the authorization information is associated with the software product. The system then modifies a database entry associated with the software product to authorize use of the software product.

18 Claims, 6 Drawing Sheets

(56) References Cited

U.S. PATENT DOCUMENTS

| | | |
|---|---|---|
| 2005/0102240 A1* | 5/2005 | Misra et al. .................... 705/59 |
| 2005/0289072 A1* | 12/2005 | Sabharwal .................... 705/59 |
| 2006/0048132 A1 | 3/2006 | Chen et al. |
| 2006/0059100 A1* | 3/2006 | Ronning et al. ................ 705/59 |
| 2006/0059561 A1* | 3/2006 | Ronning et al. ................ 726/26 |
| 2006/0106733 A1 | 5/2006 | Coley et al. |
| 2006/0116940 A1* | 6/2006 | Dippold et al. ................ 705/35 |
| 2006/0179002 A1* | 8/2006 | Brooks et al. .................. 705/59 |
| 2006/0217996 A1* | 9/2006 | Graves ............................. 705/1 |
| 2007/0107067 A1 | 5/2007 | Fountain |
| 2007/0150418 A1* | 6/2007 | Ben-Menahem et al. ...... 705/59 |

* cited by examiner

METHOD AND APPARATUS FOR AUTHORIZING A SOFTWARE PRODUCT TO BE USED ON A COMPUTER SYSTEM

BACKGROUND

To avoid losing revenue due to product theft of software products, retailers typically implement theft-deterrent measures for software products. Often, the theft-deterrent measures interfere with the shopping experience of legitimate customers because the theft deterrent measures make it more difficult to select a software product. For example, one theft deterrent measure some retailers currently use is "spider-wrap," which comprises a set of wires wrapped around a box and locked together. Spiderwrap often obscures the description of the software product written on the box of the software product. Furthermore, spiderwrap prevents a customer from opening a product "description flap," which is included with many software products. By preventing the customer from reading the product description, spiderwrap makes it difficult for the customer to select and purchase a software product.

Some retailers place software products that exceed a price threshold in a locked case or in a storage room making it not only difficult to view a product description, but also increasing the amount of time spent by the customer to select and purchase the software product.

The above-described theft-deterrent measures make it difficult for a customer to purchase a product. As a result, the theft-deterrent measures that a retailer uses to prevent lost revenue due to theft can often cause the retailer to lose revenue due to customer frustration.

SUMMARY

One embodiment of the present invention provides a system for authorizing a software product to be used on a computer system. During operation, the system receives authorization information at a database from a point of sale system located at a retailer, wherein the authorization information is associated with the software product. The system then modifies a database entry associated with the software product to authorize use of the software product.

In a variation on this embodiment, the system facilitates installation of the software product on the computer system. The process begins when the system receives verification information from the computer system, wherein the verification information is associated with the software product. Next, the system checks a database entry associated with the software product to determine if installation of the software product is authorized. If so, the system enables installation of the product. If not, the system sends a message to the computer system indicating that the product is not authorized for installation, which causes the computer system to subsequently disable the software product.

In a variation on this embodiment, the system facilitates installation of the software product on the computer system. The process begins when the system receives registration information from the computer system, wherein the registration information is associated with the software product. Next, the system checks a database entry associated with the software product to determine if the software product is authorized for use. If so, the system registers the product. If not, the system sends a message to the computer system indicating that the product is not authorized for use.

In a further variation, upon receiving a message that the product is not authorized for use, the computer system renders the software product inoperable at the computer system.

In a variation on this embodiment, the system deactivates the software product by modifying the database entry associated with the software product to indicate that the system does not authorize use of the software product.

In a further variation, upon receiving deactivation information from a second point of sale system, the system deactivates the software product, wherein the system associates the deactivation information with the software product.

In a further variation, upon reaching an expiration time, the system deactivates the software product.

In a further variation, after the system modifies the database entry, the system renders the software product inoperable at the computer system.

In a variation on this embodiment, after the system receives the authorization information, the system bills the retailer for the software product.

In a variation on this embodiment, the authorization information, deactivation information, verification information, and registration information can include: a serial number; a license number; a version identifier, which identifies the version of the software product that a customer is purchasing; a retailer's name; a retailer's location identifier; a sale price, wherein the sale price is the price the customer paid for the software product; a purchase price, wherein the purchase price is the price the retailer paid for the software product; a customer name; and a customer contact information.

In a variation on this embodiment, the system receives the authorization information from a third-party system, wherein the third-party system receives the authorization information from the point of sale system.

One embodiment of the present invention provides a system that authorizes a software product to be used on a computer system. The system operates by receiving an identifier for a software product which is being purchased at a point-of-sale system. The system then sends authorization information to a software authorizer from the point of sale system, wherein the authorization information is associated with the software product. Finally, the system receives a confirmation from the software authorizer indicating if the software product is authorized for installation.

One embodiment of the present invention provides a system that authorizes a software product to be used on a computer system. The system operates by sending registration information associated with the software product to a software authorizer. Next, the system receives authorization information associated with the software product from the software authorizer. Note that the computer system only executes the software product if the authorization information indicates the software product is authorized for use.

One embodiment of the present invention provides a computer-readable storage medium storing a software product. The software product includes a core functionality for the software product, a sending mechanism for sending registration information associated with the software product to a software authorizer, and a receiving mechanism for receiving authorization information associated with the software product from the software authorizer. Note that the software product only executes the core functionality if the authorization information indicates the software product is authorized for use.

One embodiment of the present invention provides a system for deactivating a software product used on a computer system. The system operates by receiving deactivation information associated with the software product at a database. The system then modifies a database entry in the database to indicate that the software product has been deactivated and the use of the software product is no longer authorized.

In a variation on this embodiment, the system receives deactivation information associated with the software product at a computer system. The system then deactivates the software product on the computer system so that the software product cannot be executed.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now know or later developed.

Overview

Figure 1:
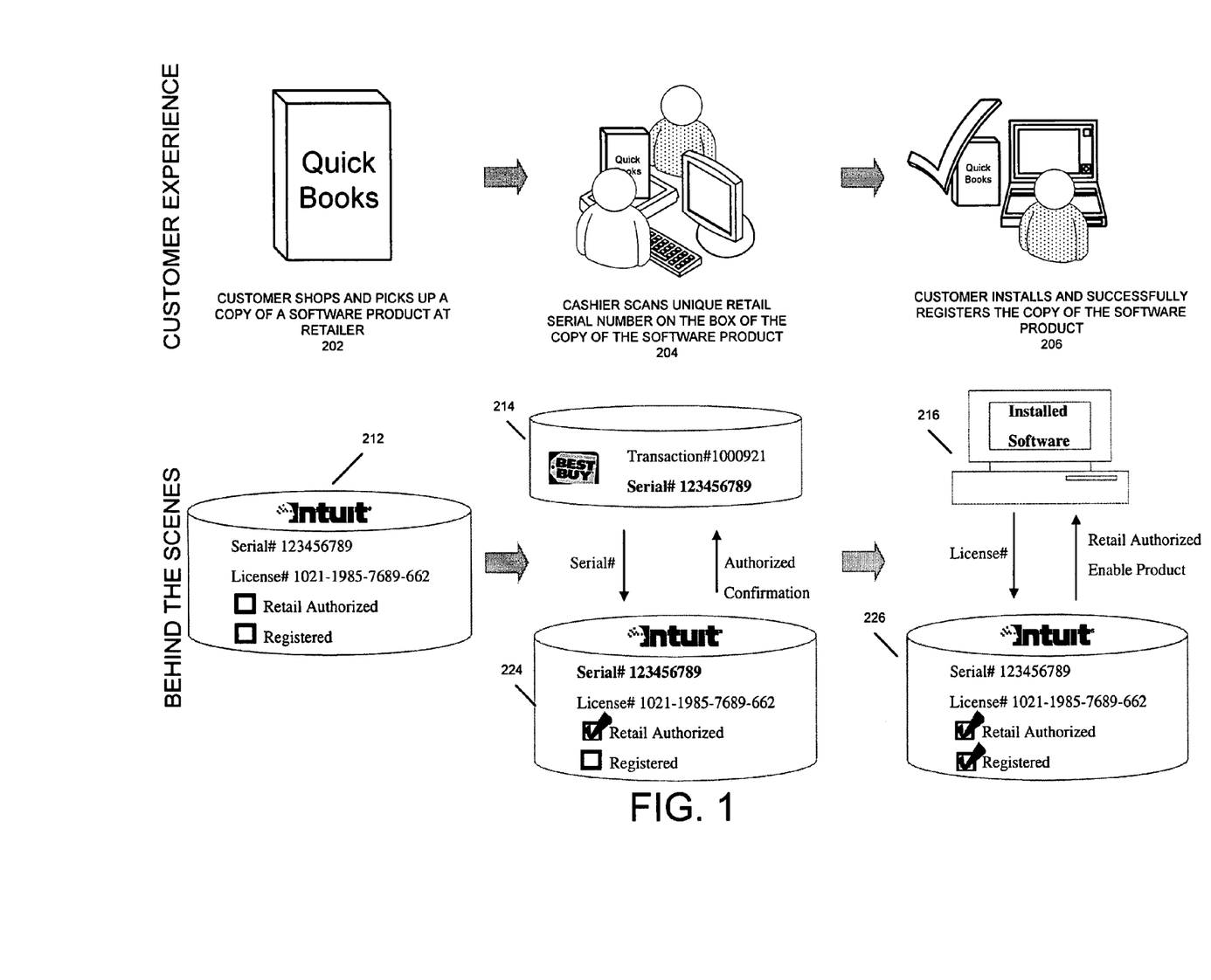
FIG. 1 illustrates the process of purchasing and installing a software product in accordance with an embodiment of the present invention.

One embodiment of the present invention teaches a method for deterring theft by authorizing the use of a software product at a point of sale system. FIG. 1 illustrates the process of purchasing and installing a software product in accordance with an embodiment of the present invention. Note that a software product can refer to a license for software already existing on a computer system, or to be installed on a computer system. In this embodiment, a customer selects a software product to purchase at a retailer, and takes the software product to a cashier to complete the purchase (step 202). Note that the customer can purchase a single license, a volume license, a consumptive or transaction-based license, or a site license for the software product. Furthermore, note that a customer can be an individual, or an organization. At this point, an authorization agent has neither authorized nor registered the copy of the software product (see 212). Note that an authorization agent can include a retail-store manager or owner, the original equipment manufacturer of the software product, or a third-party organization responsible for authorizing the software product. Furthermore, the authorization agent can be an individual or group of individuals, or a mechanism responsible for authorizing the software product.

In one embodiment of the present invention, the authorization agent ensures that a customer can only use a copy of the software product that the customer legally purchased. In this embodiment, the authorization agent includes a database entry for each copy of the software product for sale at the retailer.

Next, the cashier scans a unique serial number on the copy of the software product at a point of sale system (step 204). Scanning the unique serial number results in the retailer sending the unique serial number to the authorization agent (see 214). Then, the authorization agent records the fact that the retailer has authorized the copy of the software product for use, and sends an authorization confirmation to the retailer (see 224). Finally, the customer installs the copy of the software product on a computer system and registers the copy of the software product with the authorization agent (step 206). Installing the copy of the software product involves the computer system sending a license number associated with the copy of the software product to the authorization agent (see 216). The authorization agent then records the fact that the copy of the software product is registered, and also enables the full purchased functionality of the copy of the software product on the computer system (see 226). Note that the customer can install the copy of the software product on a plurality of computer systems, a server, or a plurality of servers. Also, note that registering the copy of the software product can include: verifying the identity of the customer; verifying the customer's authorization to use the copy of the software product; verifying the customer's authorization to install the copy of the software product; and providing customer contact and feedback information. In one embodiment of the present invention, registering the copy of the software product and verifying the customer's authorization to install and/or use the copy of the software product are separate and independent processes. In one embodiment of the present invention, registering the copy of the software product and verifying the customer's authorization to install and/or use the copy of the software product are part of the same process.

Figure 2:
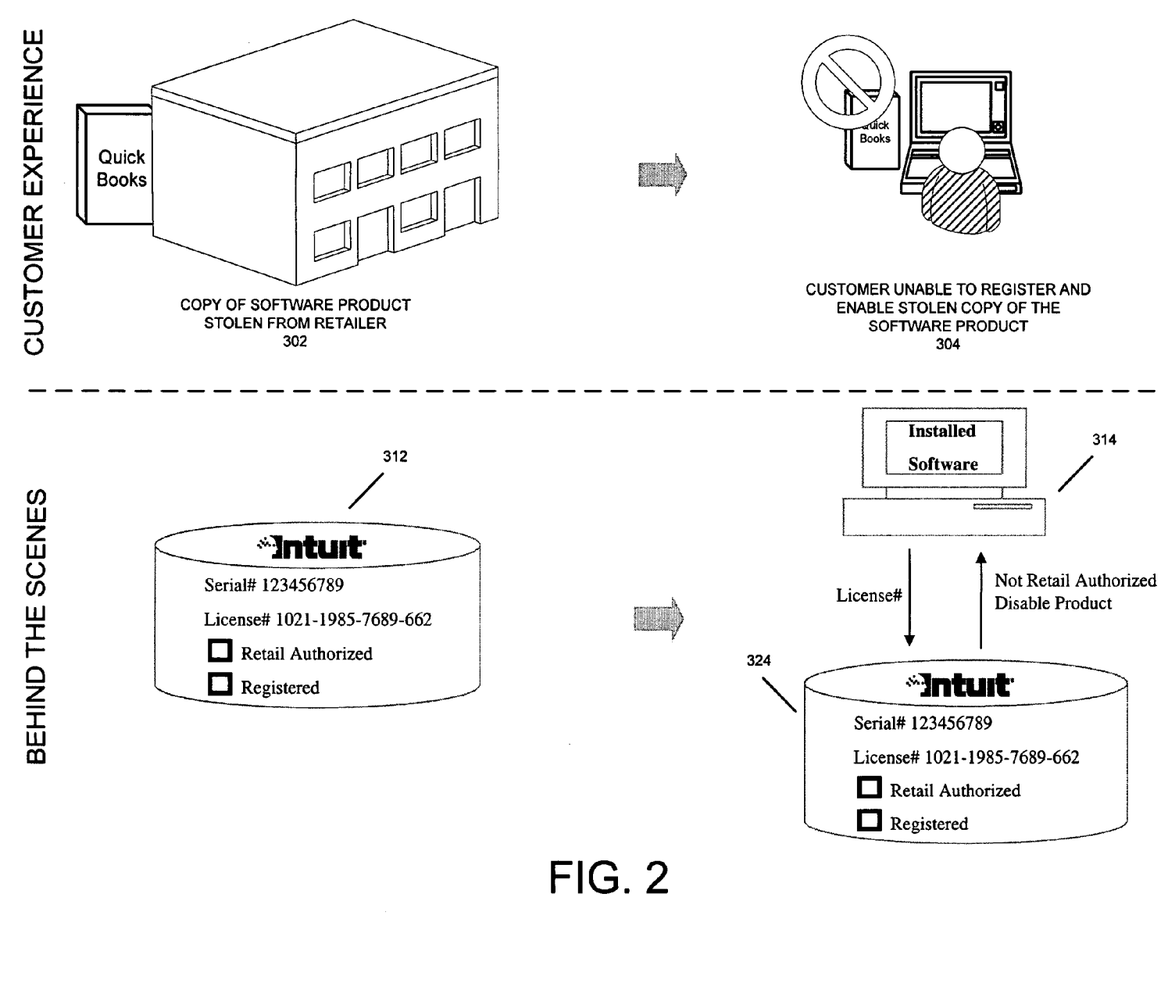
FIG. 2 illustrates the process of stealing and attempting to install a software product in accordance with an embodiment of the present invention.

FIG. 2 illustrates a process of stealing and attempting to install a software product in accordance with an embodiment of the present invention. In this embodiment, a thief steals a copy of the software product from a retailer (step 302). At this point, the authorization agent has neither authorized nor registered the copy of the software product (see 312). When the thief installs the stolen copy of the software product on a computer system, the computer system sends a license number associated with the stolen copy of the software product to the authorization agent (see 314). The authorization agent determines that the stolen copy of the software product is not authorized by the retailer and the authorization agent disables the functionality of the stolen copy of the software product on the computer system (see 324). Thus, the thief is unable to enable the functionality of the stolen copy of the software product (step 304).

Computing Environment

Figure 3:
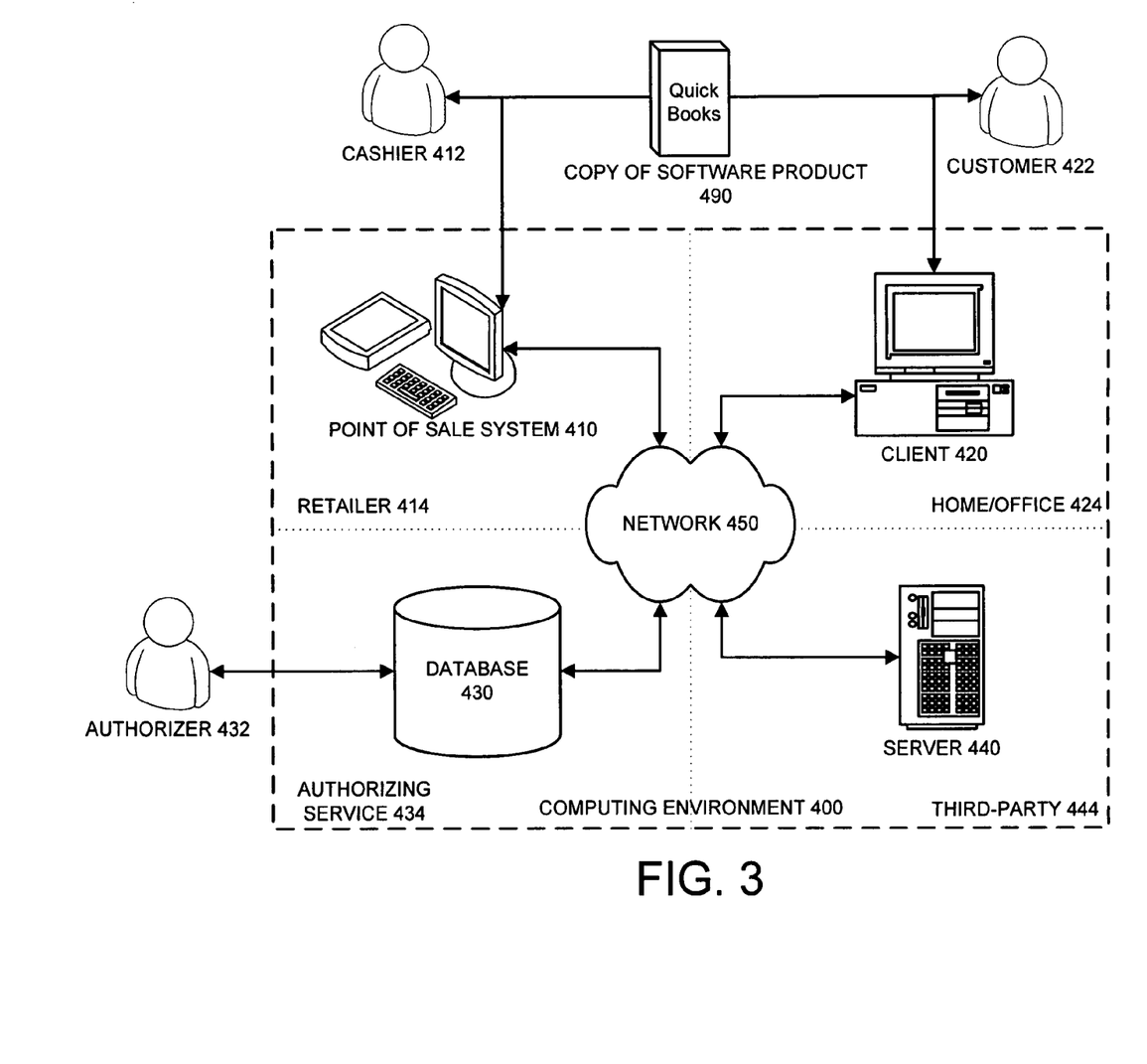
FIG. 3 illustrates a computing environment in accordance with an embodiment of the present invention.

FIG. 3 illustrates a computing environment 400 in accordance with an embodiment of the present invention. Computing environment 400 can generally include any type of computer system, including, but not limited to, a computer system based on a microprocessor, a mainframe computer, a digital signal processor, a portable computing device, a personal organizer, a device controller, and a computational engine within an appliance. Computing environment 400 includes point of sale system 410, client 420, database 430, server 440, and network 450.

In one embodiment of the present invention, computing environment 400 is divided (as illustrated by the dotted lines) into four sub-environments representing different organizations/physical locations. These sub-environments include: retailer 414 which sells the software product to customers; home/office 424 where the customer installs and uses the software product; authorizing service 434, which ensures that the copy of the software product was legally purchased prior to enabling full functionality of the software product; and third-party 444, which may perform data collection and processing to assist authorizing service 434, retailer 414, or the manufacturer of copy of software product 490.

In one embodiment of the present invention, authorizing service 434 can be the original equipment manufacturer of the copy of software product 490, or retailer 414.

In one embodiment of the present invention, home/office 424 is retailer 414.

In one embodiment of the present invention, retailer 414 is the original equipment manufacturer of the copy of software product 490.

In one embodiment of the present invention third-party 444 can be the original equipment manufacturer of the copy of software product 490, retailer 414, or authorizing service 434.

In one embodiment of the present invention, retailer 414 can be an online retailer. In this embodiment, customer 422 can download copy of software product 490 or a license for the copy of software product 490 from retailer 414's web-site or an associated web-site, or visit a brick-and-mortar store associated with retailer 414 to obtain the copy of software product 490 or a license for the copy of software product 490.

Point of sale system 410 can generally include any device capable of making and recording a purchase transaction. Typically, point of sale system 410 includes a device for scanning barcodes and a device for reading magnetic stripes, such as those found on credit cards. Point of sale system 410 can also include a device for reading radio frequency identification (RFID) tags.

Client 420 can generally include any node on a network including computational capability and including a mechanism for communicating across the network.

Database 430 can generally include any type of system for storing data. This includes, but is not limited to, systems based upon magnetic, optical, and magneto-optical storage devices, storage devices based on flash memory and/or battery-backed up memory, or other systems capable of storing computer readable data now know or later developed.

Server 440 can generally include any computational node including a mechanism for servicing requests from a client for computational and/or data storage resources.

Network 450 can generally include any type of wired or wireless communication channel capable of coupling together computing nodes. This includes, but is not limited to, a local area network, a wide area network, or a combination of networks. In one embodiment of the present invention, network 450 includes the Internet.

In one embodiment of the present invention, customer 422 decides to purchase copy of software product 490. Customer 422 takes a copy of software product 490 to cashier 412 who subsequently scans a barcode associated with the copy of software product 490 at point of sale system 410. Next, point of sale system 410 sends authorization information to database 430 via network 450 at authorizing service 434. Then, database 430 locates the database entry associated with the copy of software product 490 and records that copy of software product 490 is retail-authorized. Next, customer 422 installs the copy of software product 490 on client 420 at home/office 424. This involves client 420 contacting database 430 via network 450 and sending registration information to database 430. Database 430 uses the registration information to identify the database entry associated with the copy of software product 490 and then registers the copy of software product 490. Database 430 then enables the full functionality of the copy of software product 490 at client 420.

In one embodiment of the present invention, the authorization information can include information obtained by scanning a barcode on the box of the copy of software product 490 such as a unique serial number associated with the copy of software product 490, and a version identifier that identifies the version of computer software that customer 422 is purchasing. In addition to the information obtained by scanning the barcode on the box of the copy of software product 490, the authorization information can include: retailer 414's name; retailer 414's location identifier; the sale price, wherein the sale price is the price paid by customer 422 the for copy of software product 490; the purchase price, wherein the purchase price is the price retailer 414 paid for the copy of software product 490; customer 422's name; and customer 422's contact information.

In one embodiment of the present invention, registration information can include a serial number, a license number, retailer 414's name, customer 422's name, and customer 422's contact information.

In one embodiment of the present invention, verification information can include a serial number, a license number, retailer 414's name, customer 422's name, and customer 422's contact information.

In one embodiment of the present invention, point of sale system 410 sends the authorization information to server 440 via network 450 to perform any additional processing, such as information tracking, requested by the original equipment manufacturer (not shown), retailer 414, or authorizing service 434. The additional processing can include generating a bill for the difference between the initial purchase price (the price retailer 414 paid to obtain the copy of software product 490) and the actual purchase price (the price retailer 414 agreed to pay for the copy of software product 490). Note that the initial purchase price can be zero.

In one embodiment of the present invention, server 440 belonging to third-party 444 sends the authorization information to database 430 at authorizing service 434.

In one embodiment of the present invention, cashier 412 contacts authorizer 432 via network 450, a telephone (not shown), or any other communication method known to those familiar in the art capable of providing the authorization information to authorizer 432. Authorizer 432 then modifies an entry associated with copy of software product 490 to indicate that copy of software product 490 is retail-authorized. Note that authorizer 432 can include: a computer system that is coupled to database 430, a module within database 430, a person that has access to database 430, or a device that has access to database 430.

In one embodiment of the present invention, customer 422 contacts authorizer 432 via network 450, a telephone (not shown), or any other communication method known to those familiar in the art and provides the registration information to authorizer 432. Authorizer 432 uses the registration information to identify the database entry on database 430 associated with the copy of software product 490 and then registers the copy of software product 490. Authorizer 432 then enables the full functionality of the copy of software product 490 at client 420 by providing a license number or an authorization-key to customer 422, sending the authorization key to client 420 via a client (not shown) at authorizing service 434, or modifying an entry on database 430 associated with copy of software product 490 to indicate that copy of software product 490 is authorized for use by customer 422, client 420, or home/office 424.

In one embodiment of the present invention, retailer 414 provides the license number or authorization-key to customer 422.

In one embodiment of the present invention, copy of software product 490 is a web-based application. In this embodiment, customer 422 purchases a license from retailer 414 to download and install copy of software product 490 on client 424, or to access and use copy of software product 490 on a server, such as server 440. In this embodiment, retailer 414 can provide the license to customer 422 as a license number, an authorization-key, a dongle, a read-only storage medium, a device that can be coupled to a client that includes a license or a license certificate, or any other method for providing the license to customer 422 known to those familiar in the art.

Purchasing a Software Product

Figure 4:
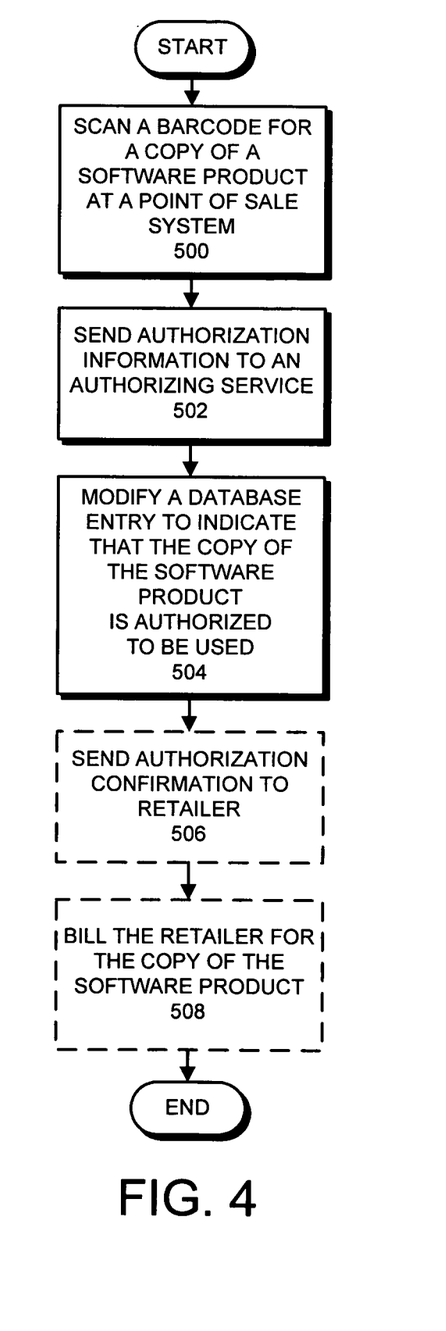
FIG. 4 presents a flowchart illustrating the process of purchasing a software product in accordance with an embodiment of the present invention.

FIG. 4 presents a flowchart illustrating the process of purchasing a software product in accordance with an embodiment of the present invention. The process begins when cashier 412 scans a barcode associated with a copy of software product 490 using point of sale system 410 (step 500). Scanning the barcode enables point of sale system 410 to obtain authorization information associated with the copy of software product 490. This authorization information can include the product name, a serial number (which is typically a unique serial number), and a version identifier which identifies the version of the copy of software product 490, wherein different versions include different levels of functionality. Point of sale system 410 can obtain additional authorization information from a computer system (not shown) associated with retailer 414 and from information that customer 422 provides to cashier 412 who subsequently provides the information to point of sale system 410 via an input device (not shown). This additional authorization information can include: retailer 414's name; retailer 414's location identifier; a copy of software product 490's sale price (the price at which retailer 422 is selling the copy of software product 490 to customer 422); a copy of computer software 490's purchase price (the price at which retailer 422 bought the copy of software product 490); customer 422's name; and customer 422's contact information. In one embodiment of the present invention, the copy of software product 490 is a complete version of a software product, but retailer 414 can sell the copy of software product 490 with different levels of functionality depending on the price customer 422 is willing to pay for a copy of software product 490. In this embodiment, authorization information can include the version of the software product that customer 422 is purchasing; or other information relevant to the purchase and licensing of a software product.

In one embodiment of the present invention, copy of software product 490 includes volume, consumptive, or site licenses.

In one embodiment of the present invention, point of sale system 410 includes an RFID reader that obtains authorization information from an RFID embedded in the copy of software product 490.

In one embodiment of the present invention, cashier 412 uses an input device such as a keyboard or a digital pen to manually enter authorization information into point of sale system 410.

Point of sale system 410 then sends the authorization information to database 430 which authorizing service 434 owns (step 502). Note that authorizing service 434 can be the original equipment manufacturer of the copy of software product 490, a third-party, or retailer 414 or an organization associated with retailer 414.

In one embodiment of the present invention, point of sale system 410 sends the authorization information to server 440 which third-party 444 owns. In this embodiment, server 440 or point of sale system 410 can send the authorization information to database 430.

Next, database 430 modifies a database entry, based on the authorization information, associated with the copy of software product 490 to indicate that the copy of software product 490 is retail authorized (step 504). Note that database 430 uses the authorization information to identify the database entry associated with the copy of software product 490.

In one embodiment of the present invention, database 430 sends an authorization confirmation to point of sale system 410 or retailer 414 (step 506). This step is optional as illustrated by the dashed lines surrounding step 506.

In one embodiment of the present invention, database 430 bills retailer 414 for the difference in the initial price, which is the price paid by retailer 414 for the copy of software product 490 prior to customer 422 purchasing the copy of software product 490 (typically the initial price is a value below the threshold value that retailer 414 uses to determine whether to use a theft deterrent device to secure the copy of software product 490) and the final price, which is the total price retailer 414 agreed to pay to the organization that sold the copy of software product 490 to retailer 414 (step 508). Note that in the case of consignment, the initial price may be zero and the organization that sold the copy of software product 490 bills retailer 414 for the purchase price of copy of software product 490 after customer 422 has purchased copy of software product 490.

Using two price points provides incentive to retailer 414 to avoid using theft deterrent devices. By not using theft deterrent devices, retailer 414 improves customer 422's shopping experience. Furthermore, retailer 414 avoids the costs associated with theft deterrent devices such as employee time spent installing and removing theft deterrent devices. This step is optional as illustrated by the dashed lines surrounding step 508.

Installing a Software Product

Figure 5:
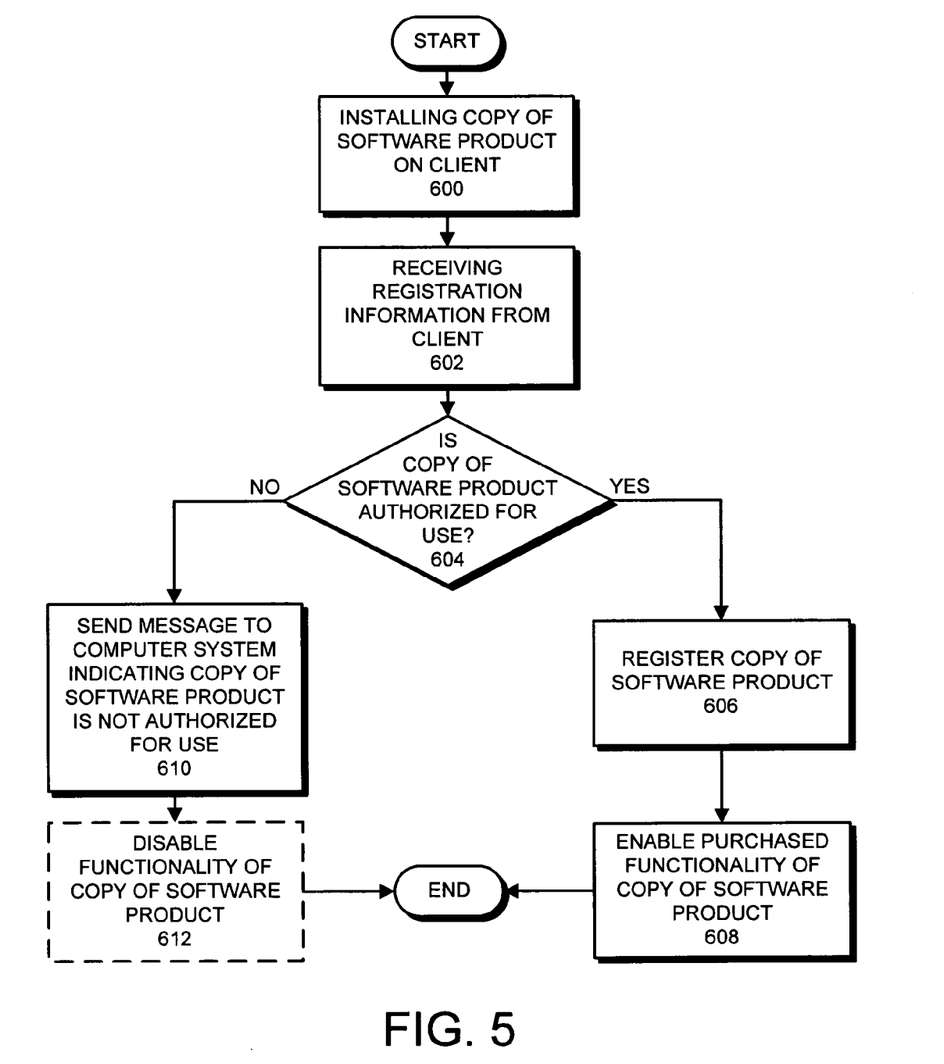
FIG. 5 presents a flowchart illustrating the process of installing a software product in accordance with an embodiment of the present invention.

FIG. 5 presents a flowchart illustrating the process of installing a software product in accordance with an embodiment of the present invention. The process begins when customer 422 installs a copy of software product 490 on client 420 (step 600). Database 430 then receives registration information from client 420 (step 602). This registration information can include a license number associated with the copy of software product 490, retailer 414's name, customer 422's name, customer 422's contact information, the name of the copy of software product 490, and the version of the copy of software product 490 that customer 422 purchased. Database 430 uses the registration information to identify the database entry associated with the copy of software product 490, and then checks if customer 422 has permission to use the copy of software product 490 (step 604). If so, database 430 registers that customer 422 owns the copy of software product 490 and has permission to use the copy of software product 490 (step 606). Database 430 then enables client 420 to execute the full functionality of the copy of software product 490 (step 608).

In one embodiment of the present invention, the process begins when customer 422 launches copy of software product 490. In this embodiment, database 430 receives verification information from client 420, which facilitates in determining if customer 422 has permission to proceed with installing, or executing copy of software product 490 on client 420. Note that "launch" can refer to launching the installation process, or launching execution of copy of software product 490.

In one embodiment of the present invention, database 430 enables client 420 to execute the purchased functionality of the copy of software product 490. Note that the purchased functionality of the copy of software product 490 may not be the full potential functionality of the copy of software product 490. This embodiment enables an organization to sell different versions of a software product on a single set of non-volatile storage media without the problem that a user who purchased a cheaper version of the software product will have access to a pricier version of the software product without paying for an upgrade.

In one embodiment of the present invention, database 430 verifies that customer 422 has permission to use the copy of software product 490 each time customer 422 attempts to use the copy of software product 490.

In one embodiment of the present invention, database 430 ensures that the number of customers using the copy of software product 490 at any given time does not exceed the number of licenses customer 422 purchased for the copy of software product 490.

In one embodiment of the present invention, database 430 ensures that customer 422 is installing the software product on a client located at a site specified by a site license.

In one embodiment of the present invention, database 430 ensures that customer 422 does not exceed the number of transactions included in a consumptive or transaction-based license.

In one embodiment of the present invention, enabling client 420 to execute the copy of software product 490 can include providing a key to unlock the copy of software product 490, decrypting the copy of software product 490, and any other method for enabling client 420 to execute the copy of software product 490 known to those familiar in the art.

If database 430 determines that customer 422 does not have permission to use the copy of software product 490, database 430 sends a message to client 420 indicating that customer 422 does not have permission to use the copy of software product 490 and that customer 422 should contact the organization that manufactures the copy of software product 490 for further assistance (step 610). Database 430 then disables the functionality of the copy of software product 490 on client 420 (step 612). This step is optional as illustrated by the dashed lines surrounding step 612.

In one embodiment of the present invention, customer 422 calls a registration agent (not shown) who works for authorizing service 434 to provide registration information to database 430. In this embodiment, the registration agent checks database 430 to determine whether customer 422 has permission to use the copy of software product 490.

In one embodiment of the present invention, database 430 receives verification information, which facilitates in determining if customer 422 has permission to install copy of software product 490 on client 420. In this embodiment, registration information determines if customer 422 has permission to use copy of software product 490, but does not prevent installation of copy of software product 490.

Deactivating a Software Product

Figure 6:
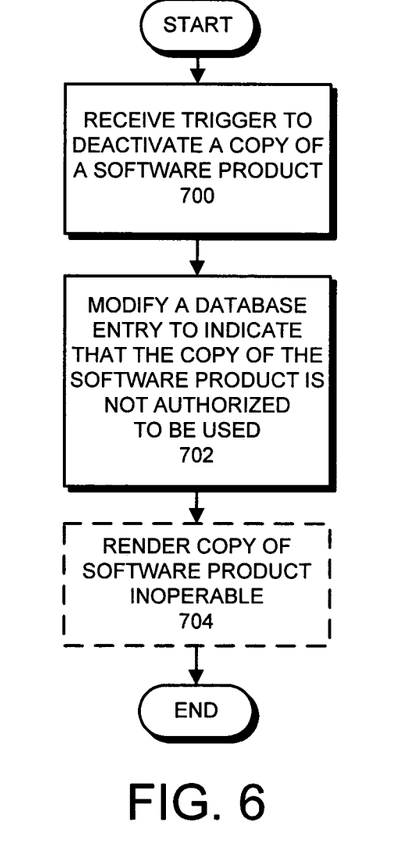
FIG. 6 presents a flowchart illustrating the process of deactivating a software product in accordance with an embodiment of the present invention.

FIG. 6 presents a flowchart illustrating the process of deactivating a software product in accordance with an embodiment of the present invention. The process begins when database 430 receives a trigger to deactivate a copy of software product 490 (step 700).

In one embodiment of the present invention, the trigger to deactivate the copy of software product 490 is an expiration time. This helps facilitate trial or grace periods of software products and for software products sold under a licensing scheme that enables the use of the software product for a limited time period. Note that a trial or grace period may or may not include the full functionality of copy of software product 490.

In one embodiment of the present invention, upon scanning the copy of software product 490, a point of sale system sends a trigger to database 430 to deactivate the copy of software product 490. This trigger includes deactivation information, which can include: a serial number associated with the copy of software product 490, retailer 414's name, retailer 414's location identifier, customer 422's name, and customer 422's contact information.

In one embodiment of the present invention, the point of sale system sending the trigger to database 430 to deactivate the copy of software product 490 is point of sale system 410.

Next, database 430 modifies a database entry associated with the copy of software product 490 to indicate that the copy of software product 490 is not authorized for use (step 702). Typically, retailers do not accept returns on opened boxes of software products for fear of contributing to copyright infringement. Using this invention, retailer 414 can accept returns, thus increasing customer satisfaction, without the fear of contributing to copyright infringement.

In one embodiment of the present invention, database 430 renders the copy of software product 490 inoperable at client 420 (step 704). This step is optional as illustrated by the dashed lines surrounding step 704.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for authorizing a software product to be used on a customer's computer, the method comprising:
   in response to a customer request to purchase a software product at a retailer under a licensing scheme, receiving, at a product database of a manufacturer, a unique serial number for the software product from a point of sale (POS) system at the retailer, wherein the unique serial number is obtained by scanning the software product at the POS system, and wherein the product database of the manufacturer includes a first database entry indicating whether the software product is retail-authorized and a second database entry indicating whether the software product is customer-owned;

upon receiving the unique serial number for the software product from a point of sale (POS) system, identifying, at the product database, the first database entry for the software product, wherein the identifying of the first database entry is based on the unique serial number;

upon identifying the first database entry for the software product, modifying, at the product database, the first database entry for the software product to indicate that the software product is retail-authorized for use, and wherein, after a purchase of the software product by the customer and prior to installing the software product at the customer's computer, the first database entry at the product database does not indicate any customer information in association with the software product; and subsequent to the purchase,
receiving, from the customer's computer, at the product database, a license number for the software product after installing the software product, wherein the customer's computer is separate from the POS system, wherein the license number is different from the unique serial number, and wherein the license number is present in the software product prior to the purchase by the customer;

identifying, at the product database, the first database entry for the software product, wherein the identifying of the first database entry subsequent to the purchase is based on the received license number;

upon confirming that the first database entry for the software product at the product database indicates that the software product is retail-authorized, modifying the second database entry at the product database to indicate that the software product is customer-owned;

when the first database entry for the software product, at the product database, indicates that the software product is retail-authorized and the second database entry indicates that the software product is customer-owned, authorizing the purchased functionality for the software product at the customer's computer;

after the software product becomes retail-authorized, billing the retailer a difference between an initial price paid by the retailer for the software product prior to the customer purchasing the software product and a final price that the retailer agreed to pay to an organization that sold the software product to the retailer;

after a time limited under the licensing scheme or upon receiving deactivation information from the POS system when returning the software product, deactivating the software product by modifying the first database entry for the software product to indicate that use of the software product is not authorized; and after modifying the first database entry, rendering the software product inoperable at the customer's computer.

2. The method of claim 1, further comprising installing the software product on the customer's computer upon confirming that the first database entry for the software product indicates that the software product is retail-authorized and is customer-owned; and upon confirming that the first database entry for the software product indicates that the software product is not retail-authorized, sending a message to the customer's computer indicating that the software product is not authorized for installation, wherein the software product is subsequently disabled on the customer's computer.

3. The method of claim 1, wherein when the software product is sold under a scheme to enable use of the software product for a limited time period defined by an expiration time, the deactivation of the software product is triggered by reaching the expiration time.

4. The method of claim 1, further comprising receiving at least one of: authorization information, deactivation information, and registration information for the software product, wherein the authorization information, the deactivation information, and the registration information includes at least one of:
the unique serial number;
the license number;
a version identifier, which identifies a version of the software product that a customer is purchasing;
a retailer's name;
a retailer's location identifier;
a customer name; and
a customer contact information.

5. The method of claim 4, wherein the authorization information is received from a third-party system, which received the authorization information from the point of sale system.

6. The method of claim 1, wherein the deactivation information is received from a second point of sale system at the database, wherein the deactivation information is associated with the software product.

7. The method of claim 1, wherein upon confirming that the software product is retail-authorized,
sending an authorization confirmation to the POS system; and
billing the retailer for the software product.

8. A non-transitory computer-readable storage medium storing instructions that when executed by a computer cause the computer to perform a method for authorizing a software product to be used on a customer's computer, the method comprising steps of:
in response to a customer request to purchase a software product at a retailer under a licensing scheme, receiving, at a product database of a manufacturer, a unique serial number for the software product from a point of sale (POS) system at the retailer, wherein the unique serial number is obtained by scanning the software product at the POS system, and wherein the product database of the manufacturer includes a first database entry indicating whether the software product is retail-authorized and a second database entry indicating whether the software product is customer-owned;
upon receiving the unique serial number for the software product from a point of sale (POS) system, identifying, at the product database, the first database entry for the software product, wherein the identifying of the first database entry is based on the received unique serial number;
upon identifying the first database entry for the software product, modifying, at the product database, the first database entry for the software product to indicate that the software product is retail-authorized for use, and wherein, after a purchase of the software product by the customer and prior to installing the software product at the customer's computer, the first database entry at the product database does not indicate any customer information in association with the software product; and subsequent to the purchase, receiving, from the customer's computer, at the product database, a license number for the software product after installing the software product, wherein the customer's computer is separate from the POS system, wherein the license number is different from the unique serial number, and wherein the license number is present in the software product prior to the purchase by the customer;

identifying, at the product database, the first database entry for the software product, wherein the identifying of the first database entry subsequent to the purchase is based on the received license number;

upon confirming that the first database entry for the software product indicates that the software product is retail-authorized, modifying the second database entry at the product database to indicate that the software product is customer-owned;

when the first database entry for the software product indicates that the software product, at the product database, is retail-authorized and the second database entry indicates that the software product is customer-owned, authorizing the purchased functionality for the software product at the customer's computer;

after the software product becomes retail-authorized, billing the retailer a difference between an initial price paid by the retailer for the software product prior to the customer purchasing the software product and a final price that the retailer agreed to pay to an organization that sold the software product to the retailer;

after a time limited under the licensing scheme or upon receiving deactivation information from the POS system when returning the software product, deactivating the software product by modifying the first database entry for the software product to indicate that use of the software product is not authorized; and after modifying the first database entry, rendering the software product inoperable at the customer's computer.

9. The computer-readable storage medium of claim 8, further comprising installing the software product on the customer's computer upon confirming that the first database entry for the software product indicates that the software product is retail-authorized and is customer-owned; and upon confirming that the first database entry for the software product indicates that the software product is not retail-authorized, sending a message to the customer's computer indicating that the software product is not authorized for installation, wherein the software product is subsequently disabled on the customer's computer.

10. The computer-readable storage medium of claim 8, wherein the deactivation of the software product is triggered by receiving deactivation information from a second point of sale system at the database, wherein the deactivation information is associated with the software product.

11. The computer-readable storage medium of claim 8, wherein when the software product is sold under a scheme to enable use of the software product for a limited time period defined by an expiration time, the deactivation of the software product is triggered by reaching the expiration time.

12. The computer-readable storage medium of claim 8, further comprising receiving at least one of: authorization information, deactivation information, and registration information associated with the software product, wherein the authorization information, the deactivation information, and the registration information includes at least one of:

the unique serial number;
the license number;
a version identifier, which identifies a version of the software product that a customer is purchasing;
a retailer's name;
a retailer's location identifier;
a customer name; and
a customer contact information.

13. The computer-readable storage medium of claim 12, wherein the authorization information is received from a third-party system, which received the authorization information from the point of sale system.

14. The computer-readable storage medium of claim 8, wherein upon confirming that the software product is retail-authorized, sending an authorization confirmation to the POS system; and
billing the retailer for the software product.

15. An apparatus that authorizes a software product to be used on a customer's computer, comprising:

a computer system;
a point of sale system located at a retailer;
a database;
a software product;
a receiving mechanism configured to receive, at a product database of a manufacturer, in response to a customer request to purchase a software product at a retailer under a licensing scheme, a unique serial number for the software product from a point of sale (POS) system at the retailer, wherein the unique serial number is obtained by scanning the software product at the POS system, and wherein the product database of the manufacturer includes a first database entry indicating whether the software product is retail-authorized and a second database entry indicating whether the software product is customer-owned;
an identifying mechanism configured to identify, at the product database, a first database entry for the software product upon receiving the unique serial number for the software product from a point of sale (POS) system, wherein the identifying of the first database entry is based on the received unique serial number;
a modifying mechanism configured to modify, at the product database, the first database entry for the software product to indicate that the software product is retail-authorized for use upon identifying the first database entry for the software product, and wherein, after a purchase of the software product by the customer and prior to installing the software product at the customer's computer, the first database entry at the product database does not indicate any customer information in association with the software product; and subsequent to the purchase, the receiving mechanism further configured to receive, from the customer's computer, at the product database, a license number for the software product after installing the software product, wherein the customer's computer is separate from the POS system, wherein the license number is different from the unique serial number, and wherein the license number is present in the software product prior to the purchase by the customer;

the identifying mechanism further configured to identify at the product database, the first database entry for the software product, wherein the identifying of the first database entry subsequent to the purchase is based on the received license number;

the modifying mechanism configured to modify the second database entry at the product database to indicate that the software product is customer-owned upon confirming that the first database entry for the software product at the product database indicates that the software product is retail-authorized;

an authorizing mechanism configured to authorize the purchased functionality for the software product at the customer's computer when the first database entry for the software product, at the product database, indicates that the software product is retail-authorized and the second database entry indicates that the software product is customer-owned;

after the software product becomes retail-authorized, a billing mechanism configured to bill the retailer a difference between an initial price paid by the retailer for the software product prior to the customer purchasing the software product and a final price that the retailer agreed to pay to an organization that sold the software product to the retailer;

after a time limited under the licensing scheme or upon receiving deactivation information from the POS system when returning the software product, a deactivation mechanism configured to deactivate the software product by modifying the first database entry for the software product to indicate that use of the software product is not authorized; and after modifying the first database entry, the deactivation mechanism configured to render the software product inoperable at the customer's computer.

16. The apparatus of claim 15, further comprising an installation mechanism configured to install the software product on the customer's computer system upon confirming that the first database entry for the software product indicates that the software product is retail-authorized and is customer-owned; and a sending mechanism further configured to send a message to the computer system indicating that the software product is not authorized for installation upon confirming that the first database entry for the software product indicates that the software product is not retail-authorized, wherein the software product is subsequently disabled on the customer's computer.

17. The apparatus of claim 15, further comprising a triggering mechanism configured to receive a trigger, wherein the trigger includes at least one of:

receiving deactivation information from a second point of sale system at the database, wherein the deactivation information is associated with the software product; and reaching an expiration time, when the software product is sold under a scheme to enable use of the software product for a limited time period defined by the expiration time.

18. The apparatus of claim 16, wherein upon confirming that the software product is retail-authorized, the sending mechanism further configured to send an authorization confirmation to the POS system, and the billing mechanism configured to bill the retailer for the software product.

* * * * *